(12) United States Patent
Touze et al.

(10) Patent No.: US 12,477,090 B2
(45) Date of Patent: Nov. 18, 2025

(54) METHOD FOR LIMITING EFFECTS OF QUANTIZATION IN A COLOR GAMUT MODIFICATION PROCESS APPLIED TO A VIDEO CONTENT

(71) Applicant: InterDigital CE Patent Holdings, SAS, Paris (FR)

(72) Inventors: David Touze, Rennes (FR); Robin Le Naour, Cesson-Sevigne (FR); Laurent Cauvin, Chevaigne (FR); Nicolas Caramelli, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/832,410

(22) PCT Filed: Jan. 23, 2023

(86) PCT No.: PCT/EP2023/051562
§ 371 (c)(1),
(2) Date: Jul. 23, 2024

(87) PCT Pub. No.: WO2023/144091
PCT Pub. Date: Aug. 3, 2023

(65) Prior Publication Data
US 2025/0133194 A1  Apr. 24, 2025

(30) Foreign Application Priority Data
Jan. 31, 2022 (EP) .................................... 22305108

(51) Int. Cl.
*H04N 11/20* (2006.01)
*H04N 19/186* (2014.01)
(52) U.S. Cl.
CPC ........... *H04N 11/20* (2013.01); *H04N 19/186* (2014.11)

(58) Field of Classification Search
CPC .......... H04N 7/01; H04N 9/64; H04N 7/0102; H04N 7/0117; H04N 9/77; H04N 11/20; H04N 19/186
(Continued)

(56) References Cited

U.S. PATENT DOCUMENTS 10,666,957 B2  5/2020  Lee et al.
2015/0146107 A1  5/2015  Greenebaum et al.
(Continued)

OTHER PUBLICATIONS

Tourapis et al., "H.264/14496-10 AVC Reference Software Manual", Joint Video Team (JVT) of ISO/IEC MPEG & ITU-T VCEG (ISO/IEC JTC1/SC29/WG11 and ITU-T SG16 Q.6), Document No. JVT-AE010, 31st Meeting: London, Great Britain, Jun. 28, 2009, 90 pages.
(Continued)

*Primary Examiner* — Sherrie Hsia
(74) *Attorney, Agent, or Firm* — Condo Roccia Koptiw LLP

(57) ABSTRACT

A method comprising applying a conversion function to first RGB picture data in a color gamut and corresponding to a first non-linear domain to obtain second RGB picture data in the same color gamut in a linear domain, said conversion function being a combination (1603) of a first and a second function, the first function being a linear function defined between zero and a second inflexion point the slope of which depending on a steepness value and the second function being a part of a linear to first non-linear domain transfer function defined from the second inflexion point, the second inflexion point being computed (1601) in the first non-linear domain from a first inflexion point obtained (1600) in the linear domain, the steepness value being computed (1602) from the first and second inflexion points.

18 Claims, 12 Drawing Sheets

(58) Field of Classification Search
USPC .............. 348/441, 453, 444, 450, 458, 459
See application file for complete search history.

(56) References Cited

U.S. PATENT DOCUMENTS

2019/0356891 A1* 11/2019 Zhang .................... H04N 11/20
2021/0337163 A1   10/2021 Diggins et al.

OTHER PUBLICATIONS

"Infrastructure of audiovisual services—Coding of moving video—Versatile Video Coding", International Telecommunication Union (ITU), ITU-T Telecommunication Standardization Sector of ITU, Series H: Audiovisual and Multimedia Systems, Recommendation ITU-T H.266, Aug. 2020, 516 pages.

"Parameter values for the HDTV Standards for Production and International Programme Exchange", International Telecommunication Union, ITU-R Radiocommunication Sector of ITU, Recommendation ITU-R BT.709-6, Jun. 2015, 19 pages.

"Information Technology—High efficiency Coding and Media Delivery in Heterogeneous Environments—Part 2: High Efficiency Video Coding", International Organization for Standardization, ISO/IEC JTC 1/SC 29/WG 11 N17661, ISO/IEC DIS 23008-2:201x, 4th Edition, Apr. 20, 2018, 874 pages.

"Reference Electro-Optical Transfer Function for Flat Panel Displays used in HDTV Studio Production", International Telecommunication Union, Radiocommunication Sector of ITU, Recommendation ITU-R Bt. 1886, Mar. 2011, 7 pages.

"Information technology—General video coding—Part 1: Essential video coding", International Organization for Standardization (ISO), Coding of audio, picture, multimedia and hypermedia information, ISO/IEC JTC 1/SC 29, Document: ISO/IEC FDIS 23094-1, Oct. 2020, 351 pages.

"Image Parameter Values for High Dynamic Range Television for Use in Production and International Programme Exchange", International Telecommunication Union, Radiocommunication Sector of ITU, Recommendation ITU-R BT.2100-2, Jul. 2018, 15 pages.

* cited by examiner

METHOD FOR LIMITING EFFECTS OF QUANTIZATION IN A COLOR GAMUT MODIFICATION PROCESS APPLIED TO A VIDEO CONTENT

CROSS REFERENCE TO RELATED APPLICATIONS

This application is a U.S. National Stage Application under 35 U.S.C. § 371 of International Patent Application No. PCT/EP2023/051562, filed Jan. 23, 2023, which is incorporated herein by reference in its entirety.

This application claims priority to European Application No. 22305108.7, filed Jan. 31, 2022, which is incorporated herein by reference in its entirety.

TECHNICAL FIELD

At least one of the present embodiments generally relates to the field of production of video and more particularly to a method, a device and a system for limiting effects of quantization in a conversion of a video content from a first color gamut to a second color gamut.

BACKGROUND

In a typical video system, many different video devices are interconnected to exchange video data. However, these devices may be designed to use different formats. A format conversion is therefore required to insure interoperability between the various devices.

For example, the recent appearance of HDR (High Dynamic Range) systems offering video contents in a dynamic range greater than that of standard-dynamic-range video (SDR video) contents creates a need for such format conversion. Indeed, in the next years, HDR systems will coexists with SDR systems which implies a need for converting HDR video contents in SDR format and conversely SDR video contents in HDR format.

A SDR video content is typically using "8" bits or "10" bits YUV data with a BT.709 Opto-electrical transfer function (OETF) and a BT.709 color gamut, as described in the BT.709 recommendation (*Recommendation ITU-R BT.709-6, Parameter values for the HDTV standards for production and international program exchange*, June 2015)

A HDR video content is typically using "10" bits or "12" bits YUV data with PQ or HLG Opto-electrical transfer function and BT.2020 color gamut as described in BT.2100 recommendation (*Recommendation ITU-R BT.2100-2, Image parameter values for high dynamic range television for use in production and international program exchange*, July 2018).

In the digital domain, exchanged video data are generally quantized data, the quantization being introduced at least by a binary representation of original data. A color gamut conversion scheme comprises several operations performed in the real domain, i.e. in the set of real numbers R (or at least with a precision larger than the precision of the quantized data (i.e. using a floating-point domain)). For instance, converting a "8" bits or "10" bits YUV video content with a BT.709 OETF and a BT.709 color gamut into a "10" bits or "12" bits YUV video content with a PQ or HLG OETF and a BT.2020 color gamut (and vice versa) comprises a conversion from a quantized domain (for example "8" or "10" bits domain) to a real domain and then a conversion from the real domain to another quantized domain (for example "10" or "12" bits domain).

It is known that quantization introduces errors. Some operations performed during color gamut conversion may amplify these errors. These amplified errors may be significant, in particular, when a converted video content is converted back in its initial color gamut.

It is desirable to overcome the above drawbacks.

It is particularly desirable to propose a method limiting effects of quantization in a conversion of a video content from a first color gamut to a second color gamut.

BRIEF SUMMARY

In a first aspect, one or more of the present embodiments provide a method comprising:
converting input YUV picture data into first RGB picture data, the input YUV picture data and the first RGB picture data being in a first color gamut and corresponding to a first non-linear domain;
converting the first RGB picture data in a linear domain to obtain second RGB picture data;
converting the second RGB picture data into a second color gamut while remaining in the linear domain to obtain third RGB picture data;
converting the third RGB picture data to fourth RGB picture data corresponding to a second non-linear domain; and,
converting the fourth RGB picture data into output YUV picture data;
wherein converting the first RGB picture data to obtain the second RGB picture data comprises:
applying a conversion function to the first RGB picture data to obtain the second RGB picture data, said conversion function being a combination of a first and a second function, the first function being a linear function defined between zero and a second inflexion point a slope of which depending on a steepness value and the second function being a part of a first non-linear domain to linear domain transfer function defined from the second inflexion point, the second inflexion point being computed in the first non-linear domain from a first inflexion point obtained in the linear domain, the steepness value being computed from the first and second inflexion points.

In a second aspect, one or more of the present embodiments provide a method comprising:
converting input YUV picture data into first RGB picture data, the input YUV picture data and the first RGB picture data being in a first color gamut and corresponding to a second non-linear domain;
converting the first RGB picture data in a linear domain to obtain second RGB picture data;
converting the second RGB picture data into a second color gamut while remaining in the linear domain to obtain third RGB picture data;
converting the third RGB picture data to fourth RGB picture data in a first non-linear domain; and,
converting the fourth RGB picture data into output YUV picture data;
wherein converting the third RGB picture data to the fourth RGB picture data comprises:
applying a conversion function to the third RGB picture data to obtain the fourth RGB picture data, said conversion function being a combination of a first and a second function, the first function being a linear function defined between zero and a first inflexion point a slope of which depending on a steepness value and the second function being a part of a linear domain to first non-linear domain transfer function defined from the first inflexion point, the first inflexion point being obtained in the linear domain, the steepness value being computed from the first inflexion point and a second inflexion point, the second inflexion point being computed in the first non-linear domain from the first inflexion point.

In an embodiment of the first or the second aspect, the first function is represented by a straight line.

In an embodiment of the first or the second aspect, the steepness value is a result of a division of the second inflexion point by the first inflexion point.

In a third aspect, one or more of the present embodiments provide a method comprising:
applying the method of the first aspect and then the method of the second aspect wherein the input YUV picture data of the method of the second aspect are representative of the output YUV picture data of the method of the first aspect.

In a fourth aspect, one or more of the present embodiments provide a device comprising electronic circuitry adapted for:
converting input YUV picture data into first RGB picture data, the input YUV picture data and the first RGB picture data being in a first color gamut and corresponding to a first non-linear domain;
converting the first RGB picture data in a linear domain to obtain second RGB picture data;
converting the second RGB picture data into a second color gamut while remaining in the linear domain to obtain third RGB picture data;
converting the third RGB picture data to fourth RGB picture data corresponding to a second non-linear domain; and,
converting the fourth RGB picture data into output YUV picture data;
wherein converting the first RGB picture data to obtain the second RGB picture data comprises:
applying a conversion function to the first RGB picture data to obtain the second RGB picture data, said conversion function being a combination of a first and a second function, the first function being a linear function defined between zero and a second inflexion point a slope of which depending on a steepness value and the second function being a part of a first non-linear domain to linear domain transfer function defined from the second inflexion point, the second inflexion point being computed in the first non-linear domain from a first inflexion point obtained in the linear domain, the steepness value being computed from the first and second inflexion points.

In a fifth aspect, one or more of the present embodiments provide a device comprising electronic circuitry adapted for:
converting input YUV picture data into first RGB picture data, the input YUV picture data and the first RGB picture data being in a first color gamut and corresponding to a second non-linear;
converting the first RGB picture data in a linear domain to obtain second RGB picture data;
converting the second RGB picture data into a second color gamut while remaining in the linear domain to obtain third RGB picture data;
converting the third RGB picture data to fourth RGB picture data in a first non-linear domain; and,
converting the fourth RGB picture data into output YUV picture data;
wherein converting the third RGB picture data to the fourth RGB picture data comprises:
applying a conversion function to the third RGB picture data to obtain the fourth RGB picture data, said conversion function being a combination of a first and a second function, the first function being a linear function defined between zero and a first inflexion point a slope of which depending on a steepness value and the second function being a part of a linear domain to first non-linear domain function defined from the first inflexion point, the first inflexion point being obtained in the linear domain, the steepness value being computed from the first inflexion point and a second inflexion point, the second inflexion point being computed in the first non-linear domain from the first inflexion point.

In an embodiment of the fourth or fifth aspect, the first function is represented by a straight line.

In an embodiment of the fourth or fifth aspect, the steepness value is a result of a division of the second inflexion point by the first inflexion point.

In a sixth aspect, one or more of the present embodiments provide a system comprising:
the device of the fourth aspect and the device of fifth aspect
wherein the input YUV picture data of the device of fifth aspect are representative of the output YUV picture data of the device of the fourth aspect.

In a seventh aspect, one or more of the present embodiments provide a computer program comprising program code instructions for implementing the method according to the first, second or third aspect.

In a eighth aspect, one or more of the present embodiments provide a non-transitory information storage medium storing program code instructions for implementing the method according to the first, second or third aspect.

DETAILED DESCRIPTION

Figure 1:
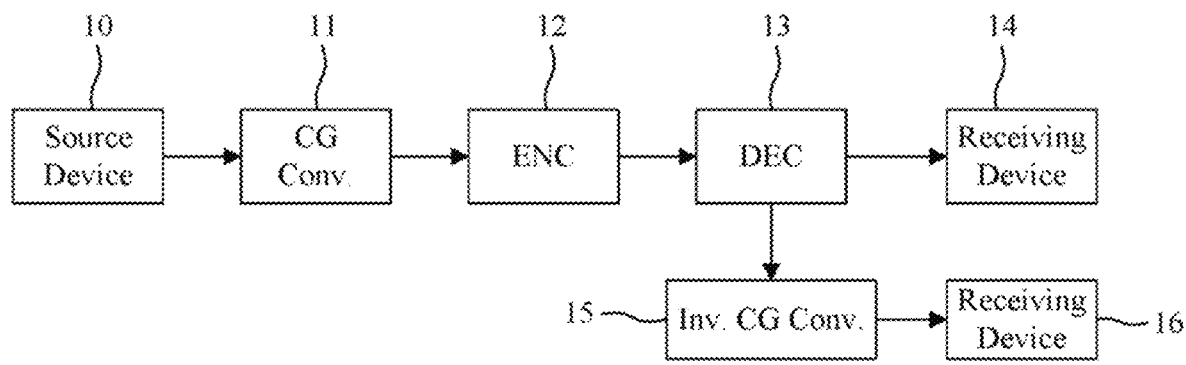
FIG. 1 illustrates schematically an example of context in which the various embodiments are implemented.

FIG. 1 illustrates an example of context in which the various embodiments are implemented.

In FIG. 1, a source device 10, such as a camera or a streaming system providing a video content, provides an input video content to a color gamut conversion module 11. The source device 10 is for instance a SDR camera generating a SDR content in a first format corresponding to "8" bits YUV data with a BT.709 OETF and a BT.709 color gamut.

The color gamut conversion module 11 converts the input video content from the first format to a second format. The second format corresponds for example to "12" bits YUV data with a PQ or HLG OETF and a BT.2020 color gamut. As already mentioned, the conversion applied in the color gamut conversion module 11 comprises operations performed in the real domain which implies a conversion from the "8" bits domain (quantized) to the real domain (not quantized) followed by a conversion from the real domain to the "12" bits domain (quantized).

Once converted, the SDR video content in the second format is provided to an encoding system 12. The encoding system 12 comprises for example an inverse tone mapping (ITM) module and a video encoder. The ITM module generates a HDR video content in the second format from the SDR video content in the second format. The HDR video content is then encoded by the video encoder in a bitstream using a video compression format such as AVC ((ISO/CEI 14496-10/ITU-T H.264), HEVC (ISO/IEC 23008-2-MPEG-H Part 2, High Efficiency Video Coding/ITU-T H.265)), VVC (ISO/IEC 23090-3-MPEG-I, Versatile Video Coding/ITU-T H.266), AV1, VP9, EVC (ISO/CEI 23094-1 Essential Video Coding) or any other video compression format adapted to encode HDR video contents. The output of the encoding system 12 is a bitstream representing the encoded HDR video content. It is to be noted that the encoding process applied by the video encoder comprises a quantization.

The encoding system 12 then provides the bitstream to a decoding system 13 for instance via a network. The decoding system 13 comprises a video decoder adapted to decode the bitstream generated by the encoding system 12. The decoding system 13 provides a decoded version of the HDR video content to a receiving device 14. The HDR video content is in the second format. The receiving device 14 is for example, a display device capable of displaying video contents in the second format.

The decoding system 13 comprises also a tone mapping (TM) module. The TM module receives the decoded version of the HDR video content in the second format and generates a SDR content in the second format from the HDR content in the second format. The SDR content in the second format is then provided to an inverse color gamut conversion module 15.

The inverse color gamut conversion module 15 converts the SDR content in the second format into a SDR content in the first format. As in the color gamut conversion module 11, the conversion applied in the inverse color gamut conversion module 15 comprises operations performed in the real domain which implies a conversion from the "12" bits domain (quantized) to the real domain (not quantized) followed by a conversion from the real domain to the "8" bits domain (quantized). The various quantizations (in the color gamut conversion module 11, in the video encoder of the encoding system 12 and in the inverse color gamut conversion module 15) implies that output video content provided by the inverse color gamut conversion module 15 is a representation of the input video content with errors.

The SDR video content in the first format is provided to a receiving device 16. The receiving device 16 is for example, a display device capable of displaying video contents in the first format.

Figure 3:
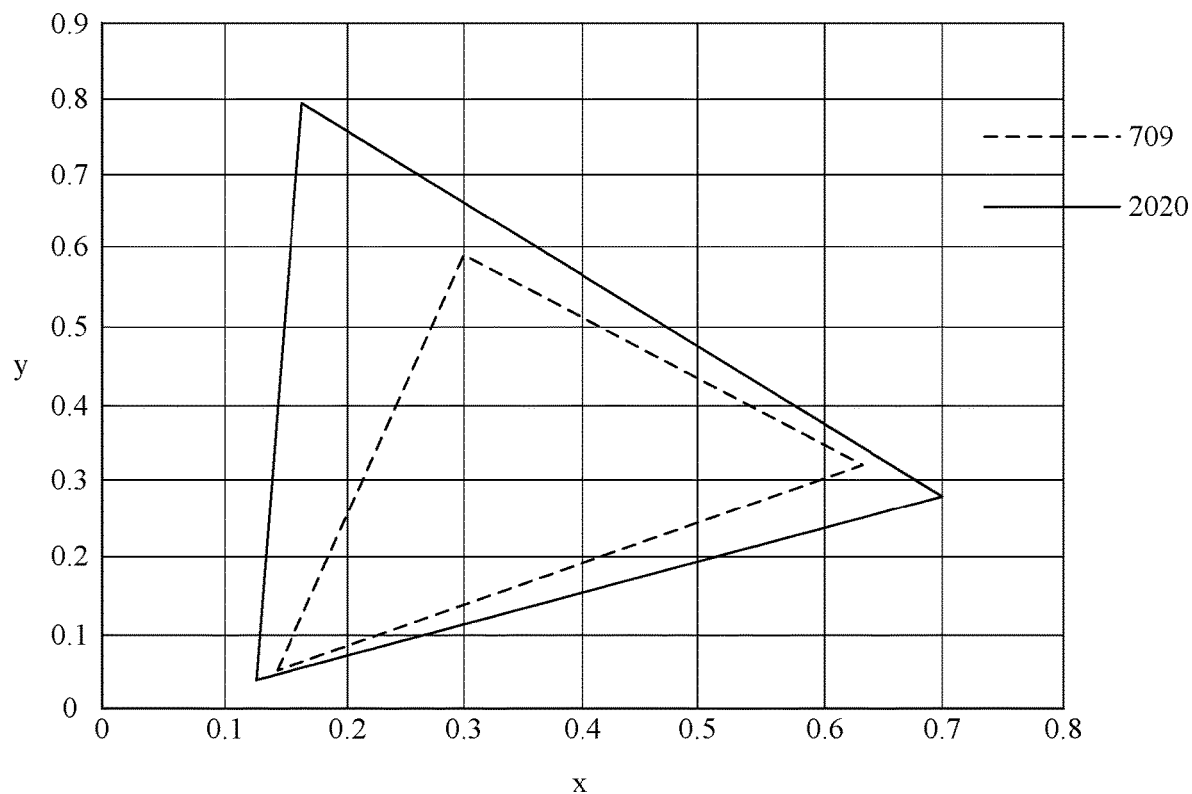
FIG. 3 illustrates a comparison of BT.709 and BT.2020 color gamuts.

The above example uses BT.2020 and BT.709 color gamuts. BT.2020 is a wider color gamut than BT.709, i.e. it is able to encode more saturated colors, as shown in FIG. 3. FIG. 3 illustrates a comparison of BT.709 and BT.2020 color gamuts.

Figure 2A:
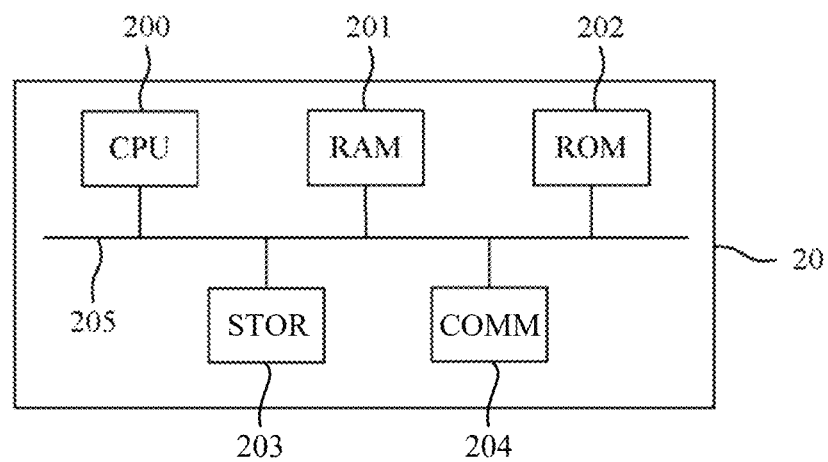
FIG. 2A illustrates schematically an example of hardware architecture of a processing module able to implement various aspects and embodiments.

FIG. 2A illustrates schematically an example of hardware architecture of a processing module 20 comprised at least in the color gamut conversion module 11 or in the inverse color gamut conversion module 15.

The processing module 20 comprises, connected by a communication bus 205: a processor or CPU (central processing unit) 200 encompassing one or more microprocessors, general purpose computers, special purpose computers, and processors based on a multi-core architecture, as non-limiting examples; a random access memory (RAM) 201; a read only memory (ROM) 202; a storage unit 203, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 204 for exchanging data with other modules, devices, systems or equipment. The communication interface 204 can include, but is not limited to, a transceiver configured to transmit and to receive data over a communication network 21 (not represented in FIG. 2A). The communication interface 204 can include, but is not limited to, a modem or a network card.

For example, the communication interface 204 enables the processing module 20 to receive a SDR video content in a first format and to output a SDR video content in a second format.

The processor 200 is capable of executing instructions loaded into the RAM 201 from the ROM 202, from an external memory (not shown), from a storage medium, or from a communication network. When the processing module 20 is powered up, the processor 200 is capable of reading instructions from the RAM 201 and executing them. These instructions form a computer program causing, for example, the implementation by the processor 200 of a process comprising the processes described in relation to FIGS. 4, 5, 6, 15 and 16.

All or some of the algorithms and steps of these processes may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit). The processor 200, a DSP, a microcontroller, a FPGA and an ASIC are therefore examples of electronic circuitry adapted to implement the processes described in relation to FIGS. 4, 5, 6, 15 and 16.

Figure 2B:
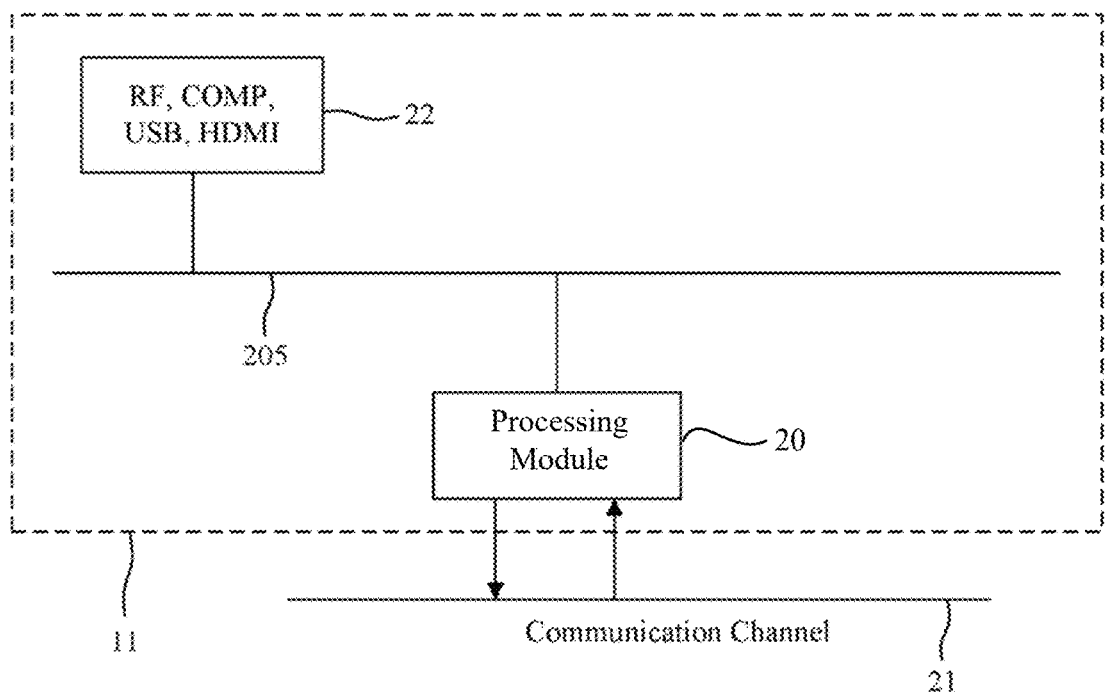
FIG. 2B illustrates a block diagram of an example of a first system in which various aspects and embodiments are implemented.
Figure 2C:
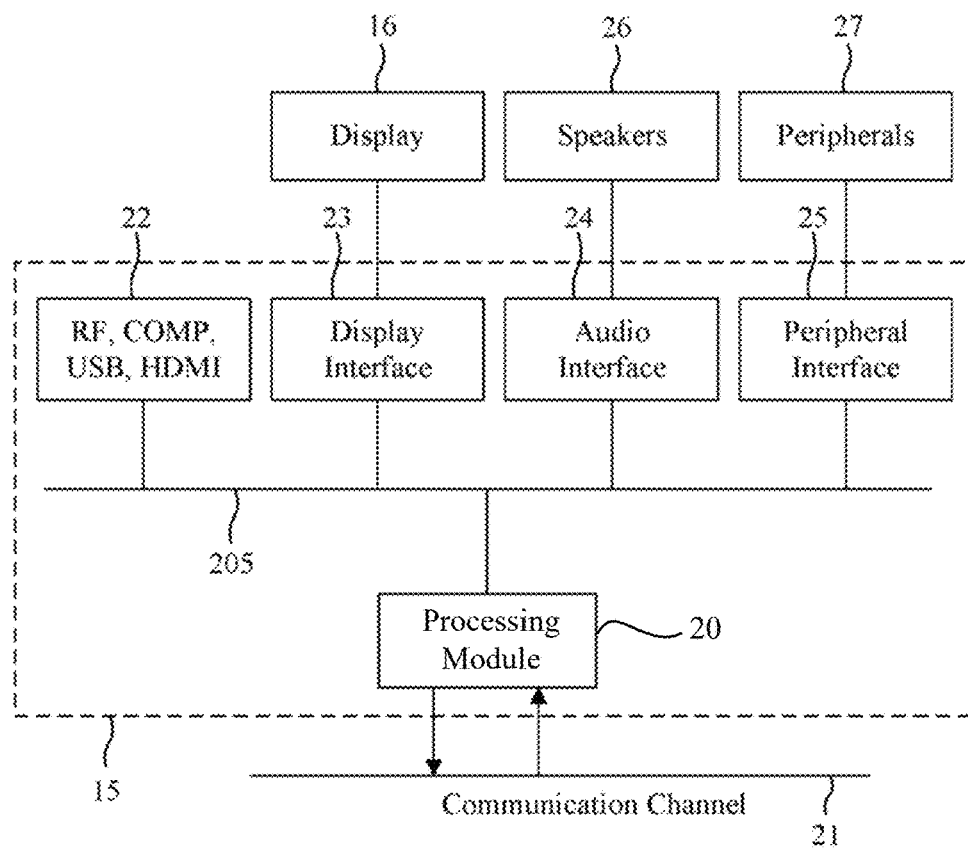
FIG. 2C illustrates a block diagram of an example of a second system in which various aspects and embodiments are implemented.

FIG. 2C illustrates a block diagram of an example of the inverse color gamut conversion module 15 in which various aspects and embodiments are implemented.

Inverse color gamut conversion module 15 can be embodied as a device including various components or modules and is configured to receive a decoded video content in a first color gamut (or the second format) and to generate a video content in a second color gamut (or in the first format). Examples of such system include, but are not limited to, various electronic systems such as a personal computer, a laptop computer, a smartphone, a tablet or a set top box. Components of the inverse color gamut conversion module 15, singly or in combination, can be embodied in a single integrated circuit (IC), multiple ICs, and/or discrete components. For example, in at least one embodiment, the inverse color gamut conversion module 15 comprises one processing module 20 that implements a conversion from a first format to a second format. In various embodiments, the inverse color gamut conversion module 15 is communicatively coupled to one or more other systems, or other electronic devices, via, for example, a communications bus or through dedicated input and/or output ports. The input to the processing module 20 can be provided through various input modules as indicated in block 22. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 2C, include composite video.

In various embodiments, the input modules of block 22 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting the inverse color gamut conversion module 15 to other electronic devices across USB and/or HDMI connections. It is to be understood that various aspects of input processing, for example, Reed-Solomon error correction, can be implemented, for example, within a separate input processing IC or within the processing module 20 as necessary. Similarly, aspects of USB or HDMI interface processing can be implemented within separate interface ICs or within the processing module 20 as necessary. The demodulated, error corrected, and demultiplexed stream is provided to the processing module 20.

Various elements of the inverse color gamut conversion module 15 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the inverse color gamut conversion module 15, the processing module 20 is interconnected to other elements of the inverse color gamut conversion module 15 by the bus 205.

The communication interface 204 of the processing module 20 allows the inverse color gamut conversion module 15 to communicate on the communication network 21. The communication network 21 can be implemented, for example, within a wired and/or a wireless medium.

Data is streamed, or otherwise provided, to the inverse color gamut conversion module 15, in various embodiments, using a wireless network such as a Wi-Fi network, for example IEEE 802.11 (IEEE refers to the Institute of Electrical and Electronics Engineers). The Wi-Fi signal of these embodiments is received over the communications network 21 and the communications interface 204 which are adapted for Wi-Fi communications. The communications network 21 of these embodiments is typically connected to an access point or router that provides access to external networks including the Internet for allowing streaming applications and other over-the-top communications. Still other embodiments provide streamed data to the inverse color gamut conversion module 15 using the RF connection of the input block 22. As indicated above, various embodiments provide data in a non-streaming manner, for example, when the inverse color gamut conversion module 15 is a smartphone or a tablet. Additionally, various embodiments use wireless networks other than Wi-Fi, for example a cellular network or a Bluetooth network.

The inverse color gamut conversion module 15 can provide an output signal to various output devices using the communication network 21 or the bus 205. For example, the inverse color gamut conversion module 15 can provide a video content in the first format to the receiving device 16.

The inverse color gamut conversion module 15 can provide an output signal to various output devices, including the receiving device 16, speakers 26, and other peripheral devices 27. The receiving device 16 could be a display device including one or more of, for example, a touchscreen display, an organic light-emitting diode (OLED) display, a curved display, and/or a foldable display. The receiving device 16 can be for a television, a tablet, a laptop, a smartphone (mobile phone), or other devices. The receiving device 16 can also be integrated with other components (for example, as in a smartphone or a tablet), or separate (for example, an external monitor for a laptop). The receiving device 16 is compatible with video contents in the second format. The other peripheral devices 27 include, in various examples of embodiments, one or more of a stand-alone digital video disc (or digital versatile disc) (DVR, for both terms), a disk player, a stereo system, and/or a lighting system. Various embodiments use one or more peripheral devices 27 that provide a function based on the output of the inverse color gamut conversion module 15. For example, a disk player performs the function of playing the output of the inverse color gamut conversion module 15.

In various embodiments, control signals are communicated between the inverse color gamut conversion module 15 and the receiving device 16, speakers 26, or other peripheral devices 27 using signaling such as AV.Link, Consumer Electronics Control (CEC), or other communications protocols that enable device-to-device control with or without user intervention. The output devices can be communicatively coupled to the inverse color gamut conversion module 15 via dedicated connections through respective interfaces. Alternatively, the output devices can be connected to the inverse color gamut conversion module 15 using the communication network 21 via the communication interface 204. The receiving device 16 and speakers 26 can be integrated in a single unit with the other components of the inverse color gamut conversion module 15 in an electronic device such as, for example, a television. In various embodiments, the display interface includes a display driver, such as, for example, a timing controller (T Con) chip.

The receiving device 16 and speakers 26 can alternatively be separate from one or more of the other components, for example, if the RF module of input 22 is part of a separate set-top box. In various embodiments in which the receiving device 16 and speakers 26 are external components, the output signal can be provided via dedicated output connections, including, for example, HDMI ports, USB ports, or COMP outputs.

FIG. 2B illustrates a block diagram of an example of the color gamut conversion module 11 adapted to convert a video content from the first format (i.e. first color gamut) to the second format (i.e. second color gamut) in which various aspects and embodiments are implemented.

Color gamut conversion module 11 can be embodied as a device including the various components and modules described above and is configured to perform one or more of the aspects and embodiments described in this document.

Examples of such devices include, but are not limited to, various electronic devices such as personal computers, laptop computers, a camera, a smartphone and a server. Elements or modules of the color gamut conversion module 11, singly or in combination, can be embodied in a single integrated circuit (IC), multiple ICs, and/or discrete components. For example, in at least one embodiment, the color gamut conversion module 11 comprises one processing module 20 that implement a conversion from the first format to the second format. In various embodiments, the color gamut conversion module 11 is communicatively coupled to one or more other systems, or other electronic devices, via, for example, a communications bus or through dedicated input and/or output ports.

The input to the processing module 20 can be provided through various input modules as indicated in block 22 already described in relation to FIG. 2C.

Various elements of the color gamut conversion module 11 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the color gamut conversion module 11, the processing module 20 is interconnected to other elements of said the color gamut conversion module 11 by the bus 205.

The communication interface 204 of the processing module 20 allows the color gamut conversion module 11 to communicate on the communication network 21. The communication network 21 can be implemented, for example, within a wired and/or a wireless medium.

Data is streamed, or otherwise provided, to the color gamut conversion module 11, in various embodiments, using a wireless network such as a Wi-Fi network, for example IEEE 802.11 (IEEE refers to the Institute of Electrical and Electronics Engineers). The Wi-Fi signal of these embodiments is received over the communications network 21 and the communications interface 204 which are adapted for Wi-Fi communications. The communications network 21 of these embodiments is typically connected to an access point or router that provides access to external networks including the Internet for allowing streaming applications and other over-the-top communications. Still other embodiments provide streamed data to the system A using the RF connection of the input block 22. As indicated above, various embodiments provide data in a non-streaming manner.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, smartphones (cell phones), portable/personal digital assistants ("PDAs"), tablets, and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations or embodiments can produce a variety of signals formatted to carry information that can be, for example, stored or transmitted. The information can include, for example, instructions for performing a method, or data produced by one of the described implementations or embodiments. For example, a signal can be formatted to carry a video content in the first or the second format of a described embodiment. Such a signal can be formatted, for example, as an electromagnetic wave (for example, using a radio frequency portion of spectrum) or as a baseband signal. The formatting can include, for example, encoding a video content in the first or the second format in an encoded stream (or bitstream) and modulating a carrier with the encoded stream. The information that the signal carries can be, for example, analog or digital information. The signal can be transmitted over a variety of different wired or wireless links, as is known. The signal can be stored on a processor-readable medium.

Various embodiments may refer to a bitstream. Bitstreams include, for example, any series or sequence of bits, and do not require that the bits be, for example, transmitted, received, or stored.

Figure 4A:
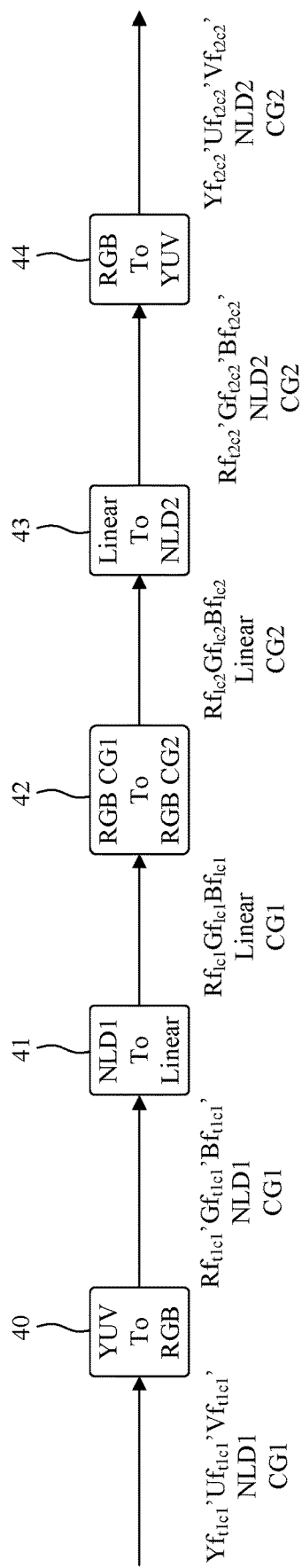
FIG. 4A illustrates schematically a conversion of a YUV signal with a given Transfer function and given color gamut to a YUV signal with another transfer function and another color gamut.

FIG. 4A illustrates schematically a first example of conversion of a YUV signal with a given transfer function and given color gamut to a YUV signal with another transfer function and another color gamut.

In FIG. 4A (and in the following FIG. 4B), any transform from a linear domain LD to a non-linear domain NLDx is called OETF. Any transform from a non-linear domain NLDy to the linear domain is called EOTF (Electro-Optical Transfer Function).

The conversion process described in relation to FIG. 4A is executed by the processing module 20 of the color gamut conversion module 11. In this example, the color gamut conversion module 11 receives input data in the form of a YUV video content. The input data are in a first color gamut CG1 and correspond to a non-linear domain NLD1. The color gamut conversion module 11 then generates output data in the form of YUV video content. The output data are in a second color gamut CG2 and correspond to a non-linear domain NLD2.

In a step 40, the processing module 20 converts the input YUV data $Yf_{t1c1}'Uf_{t1c1}'Vf_{t1c1}'$ (in the CG1 color gamut and corresponding to the non-linear domain NLD1) into RGB data $Rf_{t1c1}'Gf_{t1c1}'Bf_{t1c1}'$ (also in the CG1 color gamut and corresponding to the non-linear domain NLD1) using a YUV to RGB matrix adapted to the CG1 color gamut.

In a step 41, the processing module 20 converts the $Rf_{t1c1}'Gf_{t1c1}'Bf_{t1c1}'$ data to RGB data $Rf_{lc1}Gf_{lc1}Bf_{lc1}$ in the CG1 color gamut but corresponding to the linear domain LD with no transfer function using a non-linear converter allowing a NLD1 to linear LD conversion.

In a step 42, the processing module 20 converts the RGB data $Rf_{lc1}Gf_{lc1}Bf_{lc1}$ to RGB data $Rf_{lc2}Gf_{lc2}Bf_{lc2}$ in a CG2 color gamut while remaining in the linear domain LD with no transfer function using a RGB to RGB matrixial operation allowing a CG1 to CG2 color gamut conversion.

In a step 43, the processing module 20 converts the RGB data $Rf_{lc2}Gf_{lc2}Bf_{lc2}$ to a RGB data $Rf_{t2c2}'Gf_{t2c2}'Bf_{t2c2}'$ in the CG2 color gamut and corresponding to a non-linear domain NLD2 using a non-linear converter allowing a linear LD to NLD2 conversion.

In a step 44, the processing module 20 converts the RGB data $Rf_{t2c2}'Gf_{t2c2}'Bf_{t2c2}'$ to YUV data $Yf_{t2c2}'Gf_{t2c2}'Vf_{t2c2}'$ in the CG2 color gamut and corresponding to the non-linear domain NLD2 using a RGB to YUV matrixial operation adapted to the CG2 color gamut.

Figure 4B:
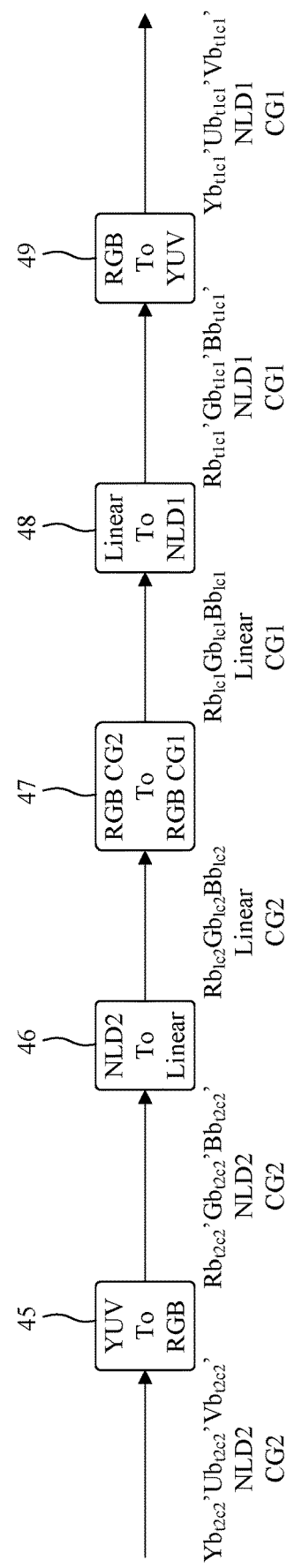
FIG. 4B illustrates schematically a second example of conversion of a YUV signal with a given transfer function and given color gamut to a YUV signal with another transfer function and another color gamut.

FIG. 4B illustrates schematically a second example of conversion of a YUV signal with a given transfer function and given color gamut to a YUV signal with another transfer function and another color gamut.

The conversion process described in relation to FIG. 4B is executed by the processing module 20 of the inverse color gamut conversion module 15. In this example, the inverse color gamut conversion module 15 receives input data in the form of a YUV video content. The input data are in the second color gamut CG2 and correspond to the non-linear domain NLD2. The inverse color gamut conversion module 15 then generates output data in the form of YUV video content. The output data are in the first color gamut CG1 and correspond to the non-linear domain NLD1. The conversion process of FIG. 4B is therefore the reverse of the process of FIG. 4A and allows regenerating YUV data in the color gamut CG1 and corresponding to the domain NLD1 from the YUV data outputted by the process of FIG. 4A.

In a step 45, the processing module 20 converts the input signal $Yb_{t2c2}'Ub_{t2c2}'Vb_{t2c2}'$ (in the CG2 color gamut and corresponding to the non-linear domain NLD2) into RGB data $Rb_{t2c2}'Gb_{t2c2}'Bb_{t2c2}'$ (also in the CG2 color gamut and corresponding to the non-linear domain NLD2) using a YUV to RGB matrixial operation adapted to the CG2 color gamut.

In a step 46, the processing module 20 converts the $Rb_{t2c2}'Gb_{t2c2}'Bb_{t2c2}'$ data to RGB data $Rb_{lc2}Gb_{lc2}Bb_{lc2}$ RGB in the CG2 color gamut but corresponding to the linear domain independent of a transfer function using a non-linear converter allowing a NLD2 to linear LD conversion.

In a step 47, the processing module 20 converts the RGB data $Rb_{lc2}Gb_{lc2}Bb_{lc2}$ to RGB data $Rb_{lc1}Gb_{lc1}Bb_{lc1}$ in the CG1 color gamut while remaining in the linear domain LD with no transfer function using a RGB to RGB matrixial operation allowing a CG2 to CG1 color gamut conversion.

In a step 48, the processing module 20 converts the RGB data $Rb_{lc1}Gb_{lc1}Bb_{lc1}$ to a RGB data $Rb_{t1c1}'Gb_{t1c1}'Bb_{t1c1}'$ in the CG1 color gamut and corresponding to the non-linear domain NLD1 using a non-linear converter allowing a linear LD to NLD1 conversion.

In a step 49, the processing module 20 converts the RGB data $Rb_{t1c1}'Gb_{t1c1}'Bb_{t1c1}'$ to YUV data $Yb_{t1c1}'Ub_{t1c1}'Vb_{t1c1}'$ in the CG1 color gamut and corresponding to the non-linear domain NLD1 using a RGB to YUV matrixial operation adapted to the CG1 color gamut.

Generally, steps 40 to 49 are done in floating-point for a better accuracy and, at the end of the process, a quantization is performed to convert YUV floating-point values into YUV binary (integer) values. Such a quantization can be performed as follows for instance:

$$Vq = \text{INT}(V+0.5) \quad (1)$$

Where V is the floating-point value, Vq is the quantized value and INT( ) is a function that only keep the integer value of V.

Figure 5:
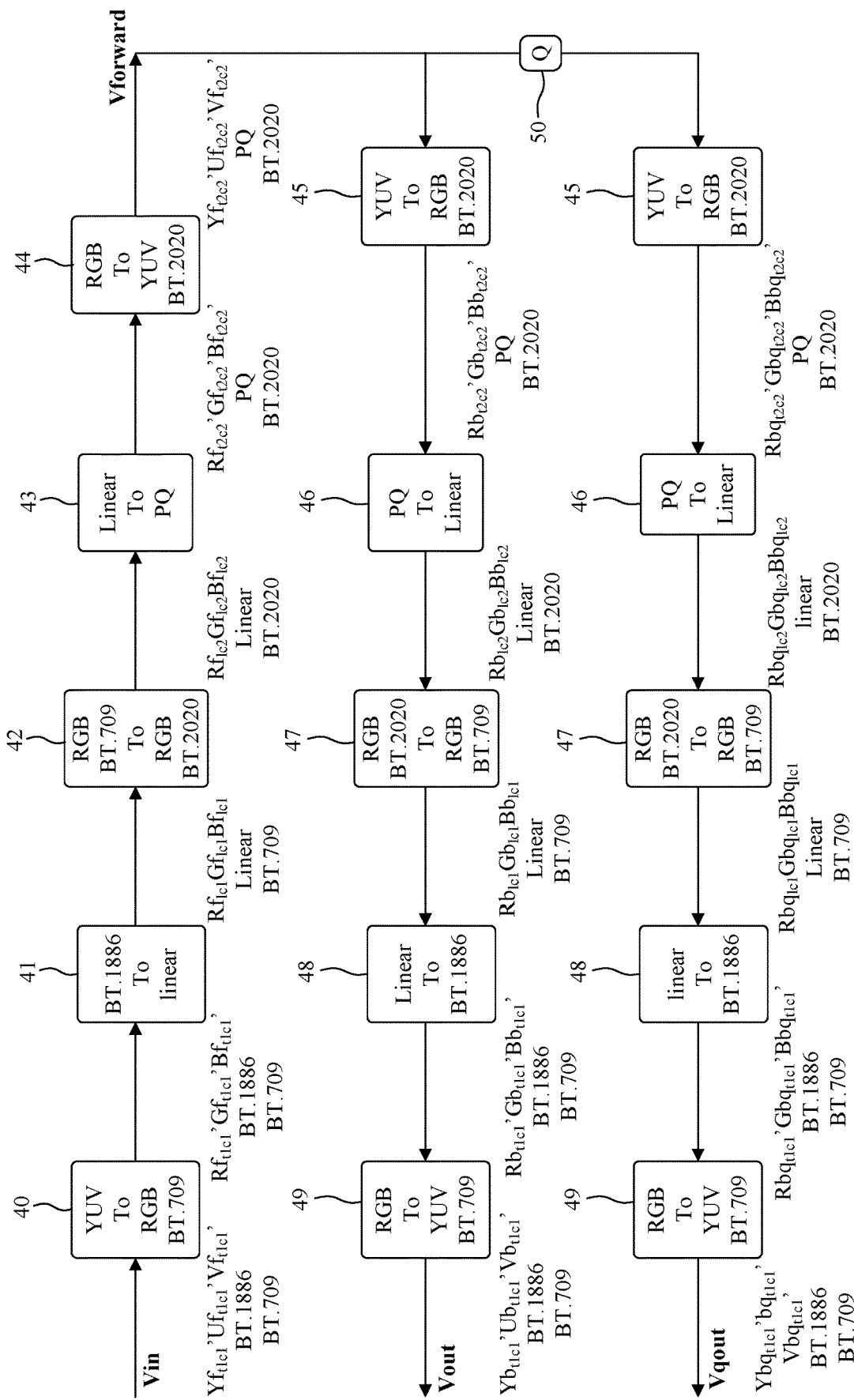
FIG. 5 illustrates schematically a conversion of a YUV BT.1886/BT.709 signal to a YUV PQ/BT.2020 signal and back to a YUV BT.1886/BT.709 signal with and without quantization.

FIG. 5 illustrates schematically a conversion of a YUV BT.1886/BT.709 signal to a YUV PQ/BT.2020 signal and back to a YUV BT.1886/BT.709 signal with and without quantization.

Keeping the notations of FIGS. 4A and 4B:
Step 41 use the BT.1886 EOTF;
Step 43 use the PQ inverse EOTF;
CG1 is the BT.709 color gamut;
Step 46 use the PQ EOTF;
Step 48 use the BT.1886 inverse EOTF;
CG2 is a BT.2020 color gamut.

In that case, an input 10 bits YUV video content in the BT.1886 non-linear domain and BT.709 color gamut (simply called YUV BT.1886/BT.709 video content) is converted to an output 10 bits YUV video content in the PQ non-linear domain and BT.2020 color gamut (simply called YUV PQ/BT.2020 video content), but with an effective color gamut limited to BT.709. The output YUV PQ/BT.2020 video content is then converted back to a 10 bits YUV video content in the BT.709 color gamut and in the BT.1886 non-linear domain representative of the input YUV BT.1886/BT.709 video content.

As already mentioned in relation to FIG. 1, but also in relation to FIGS. 4A, 4B and 5, the YUV video data outputted by the color gamut conversion module 11 (or by the encoding system 12 and the decoding system 13) are quantized. Each quantization introduces errors. The errors introduced by the binarization of floating-point data are generally small. However, these small errors can produce large errors when converting a video content obtained by conversion from a first format to a second format back to the first format (for example when converting the output YUV PQ/BT.2020 video content back to a 10 bits YUV video content in the BT.709 color gamut and in the BT.1886 non-linear domain).

FIG. 5 represents the process of FIG. 4A in the top line followed by the process of FIG. 4B in the middle and in the bottom lines. The process of FIG. 4B in the bottom line differs from the process of FIG. 4B in the bottom line in that, the input of the process of the bottom line is a quantized version of the output of the process of the top line while the process of the middle line receives directly the output of the process of the top line.

The process of the top line could be for example executed by the processing module 20 of the color gamut conversion module 11.

The process of the bottom line could be for example executed by the processing module 20 of the inverse color gamut conversion module 15.

The process of the middle line is purely illustrative and hypothetical since, in real conditions, the process of FIG. 4B never receives non-quantized data. In the example of FIG. 5 we consider that this process is executed by a processing module 20.

In the example of FIG. 5, the input video content Vin is a 10 bits YUV BT.1886/BT.709 video content in Limited Range (Y values in [64-940] range, UV values in [64-960] range).

In step 40, the processing module 20 converts the input data $Yf_{t1c1}'Uf_{t1c1}'Vf_{t1c1}'$ (noted simply Y, U and V in the following matrixial operation) into RGB data $Rf_{t1c1}'Gf_{t1c1}'Bf_{t1c1}'$ (noted simply R, G and B in the following matrixial operation) using a YUV to RGB matrixial operation M1 as follows:

$$M1: \begin{bmatrix} R \\ G \\ B \end{bmatrix} = \begin{bmatrix} 1 & 0 & 1.5748 \\ 1 & -0.18733 & -0.46813 \\ 1 & 1.85563 & 0 \end{bmatrix} \begin{bmatrix} \frac{(Y-64)}{876} * 1023 \\ \frac{(U-64)}{896} * 1023 - 512 \\ \frac{(V-64)}{896} * 1023 - 512 \end{bmatrix}$$

$$M1: \begin{bmatrix} R \\ G \\ B \end{bmatrix} = \begin{bmatrix} 1.167808 & 0 & 1.798014 \\ 1.167808 & -0.21388 & -0.53448 \\ 1.167808 & 2.118649 & 0 \end{bmatrix} \begin{bmatrix} Y \\ U \\ V \end{bmatrix} + \begin{bmatrix} -995.323 \\ 308.4235 \\ -1159.49 \end{bmatrix}$$

The output is a RGB BT.1886/BT.709 video content in Full Range (the RGB values are in the [0 ... 1023] range) and floating-point format.

In step 41, the processing module 20 uses a BT.1886 EOTF TF1, to convert the $Rf_{t1c1}'Gf_{t1c1}'Bf_{t1c1}'$ data (noted RGBin in the following equation) into the $Rf_{lc1}Gf_{lc1}Bf_{lc1}$ data (noted RGBout in the following equation). The BT.1886 EOTF TF1 is as follows:

$$RGBout = TF1(RGBin) = \left(\frac{RGBin}{1023}\right)^{2.4} \times 1023$$

The output of step 41 is RGB data in the BT.709 color gamut and in the linear domain in Full Range (the RGB values are in [0 ... 1023] range) and floating-point format.

In step 42, the processing module 20 converts the RGB data $Rf_{lc1}Gf_{lc1}Bf_{lc1}$ to the RGB data $Rf_{lc2}Gf_{lc2}Bf_{lc2}$ from the BT.709 color gamut to the BT.2020 color gamut using a matrix M2:

$$M2 = \begin{bmatrix} 0.627404 & 0.329283 & 0.043313 \\ 0.069097 & 0.91954 & 0.011362 \\ 0.016391 & 0.088013 & 0.895595 \end{bmatrix}$$

The output of step 42 is RGB data in the BT.2020 color gamut and in the linear domain in Full Range (the RGB values are in [0 . . . 1023] range) and floating-point format.

In step 43, the processing module 20 converts the RGB data $Rf_{lc2}Gf_{lc2}Bf_{lc2}$ to the RGB data $Rf_{f2c2}'Gf_{f2c2}'Bf_{f2c2}'$ using a linear to PQ transform TF2. The linear to PQ transform TF2 corresponds to the inverse EOTF function detailed in table 4 of document *Recommendation ITU-R BT.2100-2, Image parameter values for high dynamic range television for use in production and international program exchange*, July 2018.

In step 44, the processing module 20 converts the RGB data $Rf_{f2c2}'Gf_{f2c2}'Bf_{f2c2}'$ to the YUV data $Yf_{f2c2}'Uf_{f2c2}'Vf_{f2c2}'$ using a RGB to YUV matrixial operation M3:

$$M3: \begin{bmatrix} Y \\ U \\ V \end{bmatrix} = \begin{bmatrix} 0.224951 & 0.580575 & 0.050779 \\ -0.1223 & -0.31563 & 0.437928 \\ 0.437928 & -0.40271 & -0.03522 \end{bmatrix} \begin{bmatrix} R \\ G \\ B \end{bmatrix} + \begin{bmatrix} 64 \\ 512 \\ 512 \end{bmatrix}$$

The output of step 44 is a YUV PQ/BT.2020 video content Vforward in Limited Range (Y values in [64-940] range, UV values in [64-960] range) and floating-point format.

In step 45, the processing module 20 converts the input data $Yb_{f2c2}'Ub_{f2c2}'Vb_{f2c2}'$ (noted simply Y, U and V in the following equation) into the RGB data $Rb_{f2c2}'Gb_{f2c2}'Bb_{f2c2}'$ (noted simply R, G and B in the following equation) using a YUV to RGB matrixial operation M4:

$$M4: \begin{bmatrix} R \\ G \\ B \end{bmatrix} = \begin{bmatrix} 1 & 0 & 1.4746 \\ 1 & -0.16455 & -0.57135 \\ 1 & 1.8814 & 0 \end{bmatrix} \begin{bmatrix} \frac{(Y-64)}{876}*1023 \\ \frac{(U-64)}{896}*1023-512 \\ \frac{(V-64)}{896}*1023-512 \end{bmatrix}$$

$$M4: \begin{bmatrix} R \\ G \\ B \end{bmatrix} = \begin{bmatrix} 1.167808 & 0 & 1.683611 \\ 1.167808 & -0.18787 & -0.65233 \\ 1.167808 & 2.148072 & 0 \end{bmatrix} \begin{bmatrix} Y \\ U \\ V \end{bmatrix} + \begin{bmatrix} -936.749 \\ 355.4464 \\ -1174.55 \end{bmatrix}$$

The output is a RGB PQ/BT.2020 video content in Full Range (RGB values in [0 . . . 1023] range) and floating-point format.

In step 46, the processing module 20 converts the data $Rb_{f2c2}'Gb_{f2c2}'Bb_{f2c2}'$ data into the data $Rb_{lc2}Gb_{lc2}Bb_{lc2}$ using a non-linear transform TF3. The non-linear transform TF3 is the EOTF detailed in table 4 of document *Recommendation ITU-R BT.2100-2, Image parameter values for high dynamic range television for use in production and international program exchange*, July 2018. The output of step 46 is RGB data in the BT.2020 color gamut and in the linear domain in Full Range (RGB values in [0 . . . 1023] range) and floating-point format.

In step 47, the processing module 20 converts the RGB data $Rb_{lc2}Gb_{lc2}Bb_{lc2}$ to the RGB data $Rb_{lc1}Gb_{lc1}Bb_{lc1}$ using a RGB to RGB matrix M5:

$$M5 = \begin{bmatrix} 1.660491 & -0.58764 & -0.07285 \\ -0.12455 & 1.1329 & -0.00835 \\ -0.01815 & -0.10058 & 1.11873 \end{bmatrix}$$

The output of step 47 is RGB data in the BT.709 color gamut and in the linear domain in Full Range (RGB values in [0 . . . 1023] range) and floating-point format.

In step 48, the processing module 20 converts the RGB data $Rb_{lc1}Gb_{lc1}Bb_{lc1}$ (noted simply RGBin in the following equation) to the RGB data $Rb_{f1c1}'Gb_{f1c1}'Bb_{f1c1}'$ (noted RGBout in the following equation) using a non-linear transform (i.e. BT.1886 inverse EOTF) TF4:

$$RGBout = TF4(RGBin) = \left(\frac{RGBin}{1023}\right)^{1/2.4} \times 1023$$

The output of step 48 is RGB data in the BT.709 color gamut and in the BT.1886 non-linear domain in Full Range (the RGB values are in [0 . . . 1023] range) and floating-point format.

In step 49, the processing module 20 converts the RGB data $Rb_{f1c1}'Gb_{f1c1}'Bb_{f1c1}'$ to the YUV data $Yb_{f1c1}'Ub_{f1c1}'Vb_{f1c1}'$ using a RGB to YUV matrixial operation M6:

$$M6: \begin{bmatrix} Y \\ U \\ V \end{bmatrix} = \begin{bmatrix} 0.18205 & 0.612429 & 0.061825 \\ -0.10035 & -0.33758 & 0.437928 \\ 0.437928 & -0.39777 & -0.04016 \end{bmatrix} \begin{bmatrix} R \\ G \\ B \end{bmatrix} + \begin{bmatrix} 64 \\ 512 \\ 512 \end{bmatrix}$$

The output is a YUV BT.1886/BT.709 video content in Limited Range (Y values in [64-940] range, UV values in [64-960] range) and floating-point format. FIG. 5 comprises a step 50 corresponding to a quantization. The quantization is for instance the one represented by equation (1) above. The output of step 50 is representative of the output of the color gamut conversion module 11.

In FIG. 5, the process of FIG. 4B results in two different outputs:
A video content Vout when the input of the process of FIG. 4B is the video content Vforward;
A video content Vout when the input of the process of FIG. 4B is a quantized version of the video content Vforward outputted by step 50.

Figure 6:
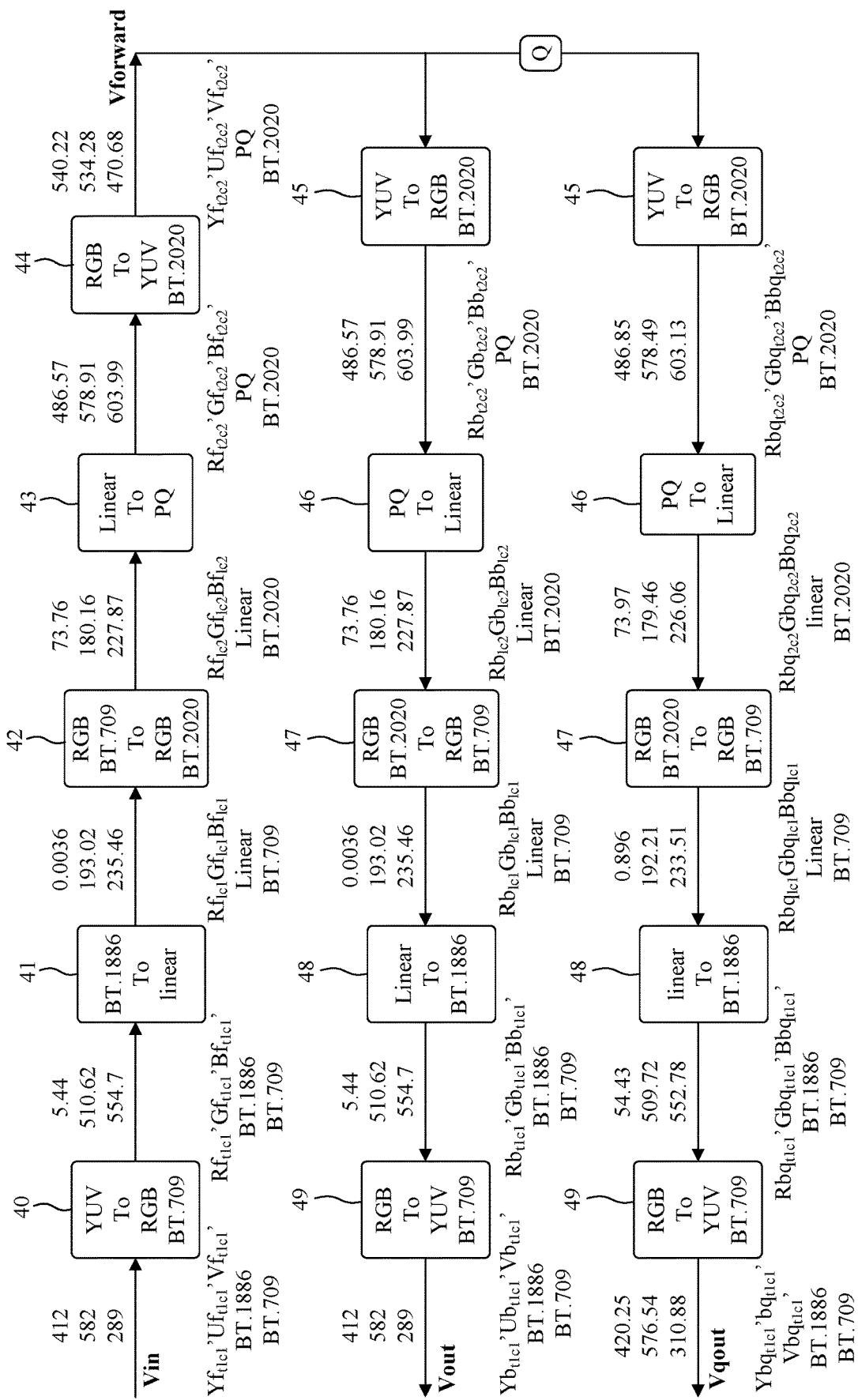
FIG. 6 illustrates an example of a conversion with and without quantization.

FIG. 6 illustrates an example of a conversion with and without quantization. This example illustrates numerically the effect of a color gamut conversion process on a data affected by quantization errors. In FIG. 6, the process described in relation to FIG. 5 is applied to an input value Vin equal to (Y=412, U=582, V=289).

In this example, one can notice that:
Without quantization on Vforward, the backward conversion using floating-point computation outputs a video content Vout identical to the video content Vin.
When a quantization is applied to Vforward, the backward conversion using floating-point computation outputs a video content Vqout with noticeable differences:
 error on Y=8.25;
 error on U=5.46;
 error on V=21.88.
This means that a small error introduced by a quantization introduces a noticeable modification on the reconstructed video content Vqout which is not acceptable in many applications. There is a need to find a solution to lower or cancel the error induced by the quantization.

As can be noticed from FIGS. 5 and 6, the error introduced by the quantization has a small and neglectable effect on the YUV data Ybqt2c2'Ubqt2c2'Vbqt2c2' (input of step 45 in the bottom line), Rbqt2c2'Gbqt2c2'Bbqt2c2' (input of step 46 in the bottom line) and Rbqlc1Gbqlc1Bbqlc1 (input of step 47 in the bottom line).

However, at the output of step 47, one can notice a relatively important error on the component Rbqlc2 (i.e. 0.896 instead of 0.0036 in the middle line without quantization). Even if this error is limited at this stage because the value is still below the "1" (relative to the [0 . . . 1023] range of the signal), as can be seen in FIG. 6, this error is amplified by the non-linear transform TF4. Indeed, one can notice that at the output of step 48 the error on the component Rbqt2c2' is now very large compared to the original value (i.e. 54.43 instead of 5.44). Then this large error is spread by the following RGB to YUV conversion, that leads to large differences on the three YUV components of video content Vqout.

This observation can be generalized: when one of the components of the RGB data Rflc1Gflc1Bflc1 is small (i.e. well below "1"), an error introduced by a quantization on Vforward is amplified in the RGB data Rbqlc2Gbqlc2Bbqlc2. This error introduces a far larger amplification on the RGB data Rbqt2c2'Gbqt2c2'Bbqt2c2'.

Figure 7:
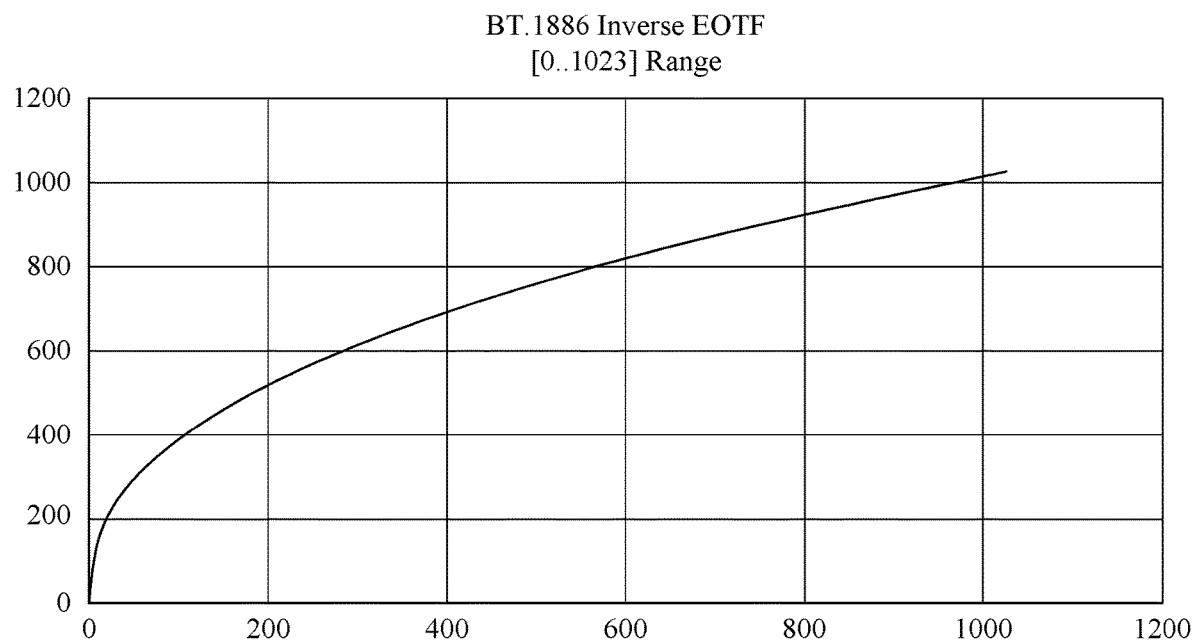
FIG. 7 illustrates a linear to BT.1886 transfer function in the [0 . . . 1023] range.

This large amplification in step 48 is due to the very steep shape of the BT.1886 inverse EOTF TF4 in very low values. Indeed, as can be seen in FIG. 7, at low values, a small difference at the input generates a large difference at the output due to the steepness of the curve.

Figure 8:
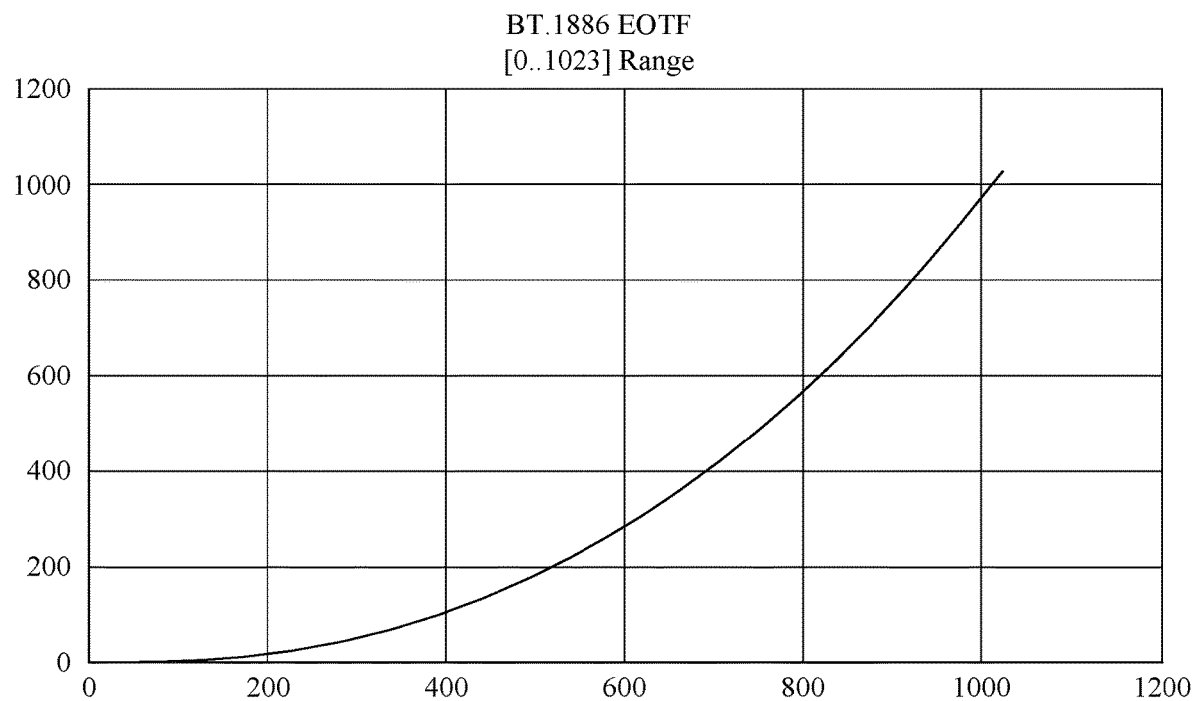
FIG. 8 illustrates a BT.1886 to linear transfer function in the [0 . . . 1023] range.

FIG. 8 illustrates the BT.1886 EOTF TF1 in the [0 . . . 1023] range.

In order to reduce the amplification effect in step 48, it is proposed to replace the BT.1886 inverse EOTF TF4, by a modified BT.1886 inverse EOTF TF4mod.

Indeed, as explained previously, the steepness of the BT.1886 inverse EOTF TF4 is the main cause of the error amplification. The modified inverse EOTF TF4mod is designed in order to keep the properties of the inverse EOTF TF4, while reducing the amplification effect where is occurs. The modified inverse EOTF TF4mod is therefore a combination of a first and a second function:
- the first function is a function passing through the origin (0,0) defined between zero and an inflexion point, the slope of which is controlled by a steepness value. In an embodiment; this first function is less steep than the BT.1886 inverse EOTF. For example, the first function corresponds to a straight line the slope of which (for example at the origin (0,0)) depending on the steepness value; and,
- the second function corresponds to a part of the BT.1886 inverse EOTF defined from the inflexion point for the remaining values of the [0 . . . 1023] range.

Figure 16:
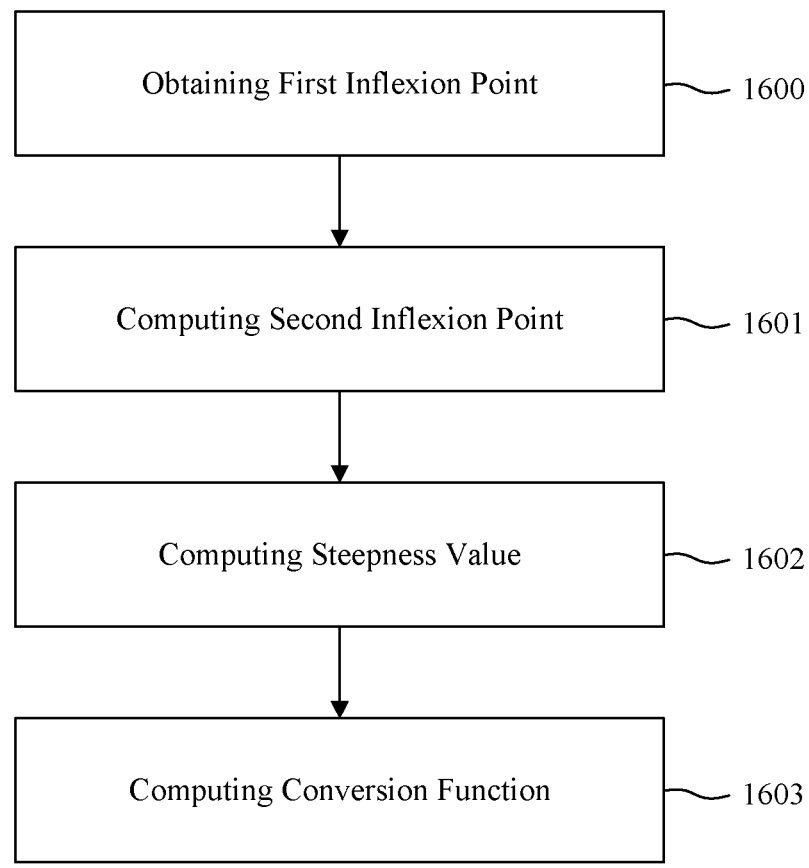

FIG. 16 illustrates schematically a method for computing the modified BT.1886 inverse EOTF TF4mod, with the first function being a straight line The method of FIG. 16 could be an offline process, the modified BT.1886 inverse EOTF TF4mod being provided to the inverse color gamut conversion module 15 by external means or being an online process executed by the processing module 20 of the inverse color gamut conversion module 15. In the following, we consider that the processing module 20 of the inverse color gamut conversion module 15 computes the modified BT.1886 inverse EOTF TF4mod when necessary.

In a step 1600, the processing module 20 obtains a first inflexion point $I_{lin}$ in the linear domain. The first inflexion point $I_{lin}$ is a value in the [0 . . . 1] range for example provided by a user. The inflexion point corresponds to the abscissa of the modified BT.1886 inverse EOTF TF4mod up to which the first function, i.e. a straight line for instance, is applied.

In an embodiment, the first inflexion point $I_{lin}$ is for example determined in function of a maximum error expected between $Yf_{t1c1}'Uf_{t1c1}'Vf_{t1c1}'$ and $Ybq_{t1c1}'Ubq_{t1c1}'Vbq_{t1c1}'$ on a training set of YUV values.

In another embodiment adapted to the context of a HDR/SDR video production workflow, i.e. a process wherein a SDR content is converted by an ITM process into a HDR content and the obtained HDR content is then converted back into a SDR content by a TM process, the first inflexion point $I_{lin}$ is chosen adequately in order to obtain a good trade-off between a quality of the HDR content provided by the ITM process and the accuracy of a backward conversion of the HDR content into the SDR content by the TM process.

In a step 1601, the processing module 20 computes a second inflexion point $IBT_{1886}$ in the BT.1886 non-linear domain from the first inflexion point $I_{lin}$. The second inflexion point $IBT_{1886}$ is a value in the [0 . . . 1] range and is computed as follows:

$$I_{BT1886} = I_{lin}^{1/2.4}$$

In a step 1602, the processing module 20 computes a steepness value $Steep_{T4}$ from the first inflexion point $I_{lin}$ and the second inflexion points $I_{BT1886}$. The steepness value $Steep_{T4}$ is computed as follows:

$$Steep_{T4} = I_{BT1886}/I_{lin}$$

The steepness value $Steep_{T4}$ represents a slope at the origin of the straight line representing the first function.

In a step 1603, the processing module 20 computes the modified BT.1886 inverse EOTF TF4mod as follows:

$$\text{If } (x/1023) < I_{lin}, y = x \times Steep_{T4}$$

$$\text{Else } y = \frac{x}{1023}^{1/2.4} \times 1023$$

With x in [0 . . . 1023] and y in [0 . . . 1023].

The use of a modified BT.1886 inverse EOTF TF4mod implies a modification of the inverse of the inverse EOTF TF4 (i.e. the BT.1886 EOTF TF1). A modified EOTF TF1mod is obtained by applying a process similar to the process of FIG. 16 wherein step 1603 is replaced by a step 1603'. Again, the method of FIG. 16 with step 1603' instead of step 1603 could be an offline process, the modified BT.1886 EOTF TF1mod being provided to the color gamut conversion module 11 by external means or being an online process executed by the processing module 20 of the color gamut conversion module 11. In the following, we consider that the processing module 20 of the color gamut conversion module 11 computes the BT.1886 EOTF TF1mod when necessary.

In step 1603', the processing module 20 computes the modified BT.1886 EOTF TF1mod as follow:

If $(x/1023) < I_{BT1886}$, $y = x/\text{Steep}_{T4}$

Else $y = \frac{x}{1023}^{2.4} \times 1023$

With x in [0 ... 1023] and y in [0 ... 1023].

In the example of context of FIG. 1, the processing module 20 of the color gamut conversion module 11 uses the process of FIG. 4A with the modified BT.1886 EOTF TF1mod in step 41 to generate the RGB data $Rf_{lc1} Gf_{lc1} Bf_{lc1}$. The processing module 20 of the inverse color gamut conversion module 15 uses the process of FIG. 4B with the modified BT.1886 inverse EOTF TF4mod in step 48 to generate the RGB data RGB data $Rb_{r1c1}' Gb_{r1c1}' Bb_{r1c1}'$.

Figure 9:
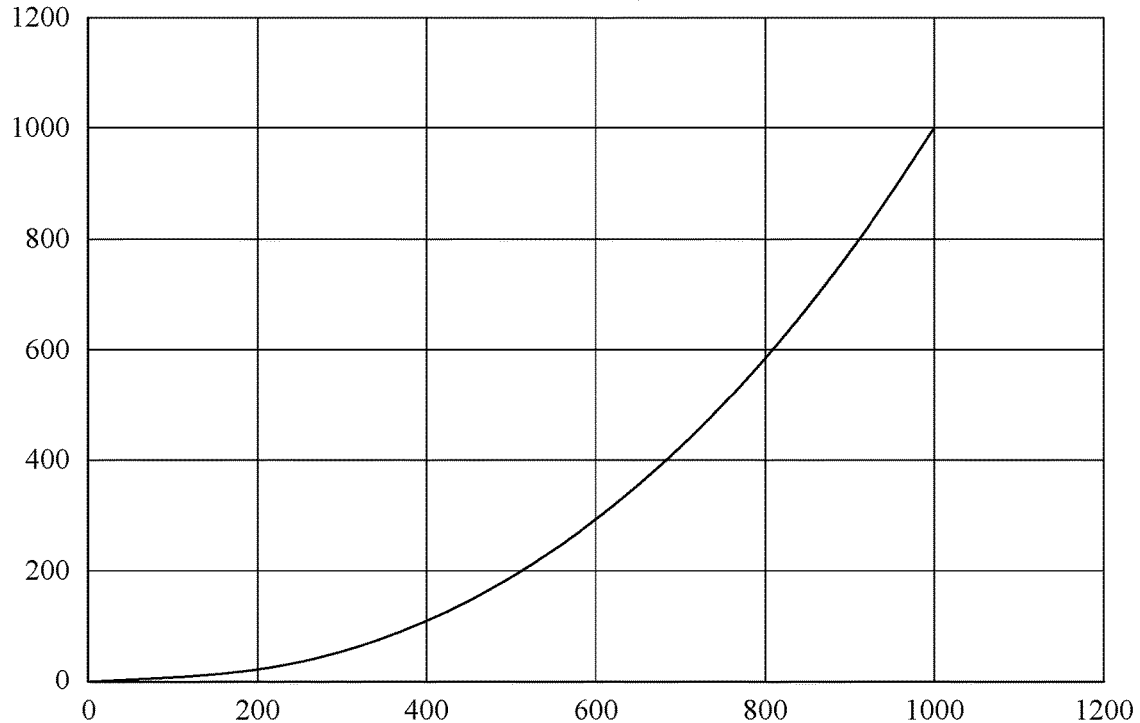
FIG. 9 illustrates a modified BT.1886 to linear transfer function.
Figure 10:
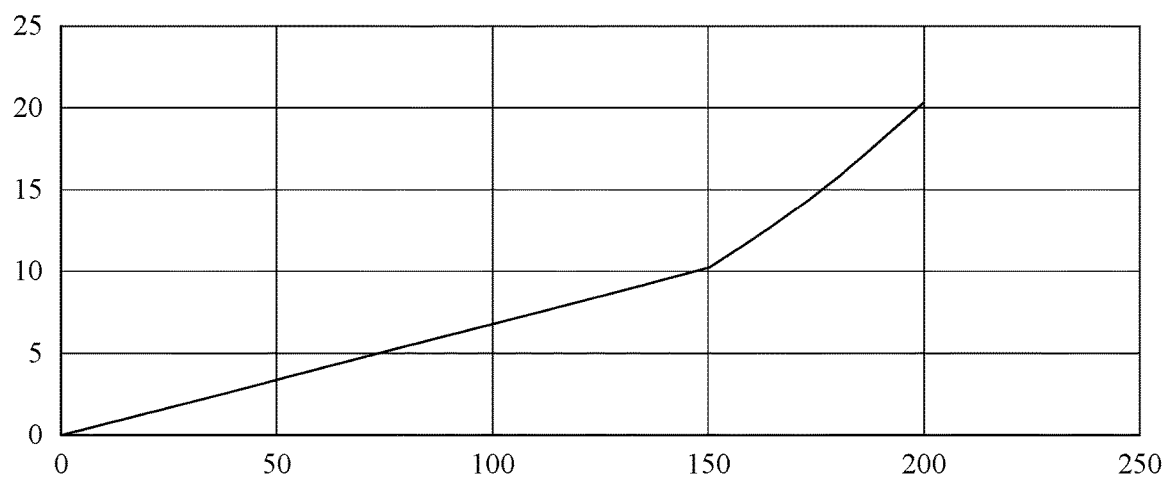
FIG. 10 illustrates a detail of the modified BT.1886 to linear transfer function.
Figure 11:
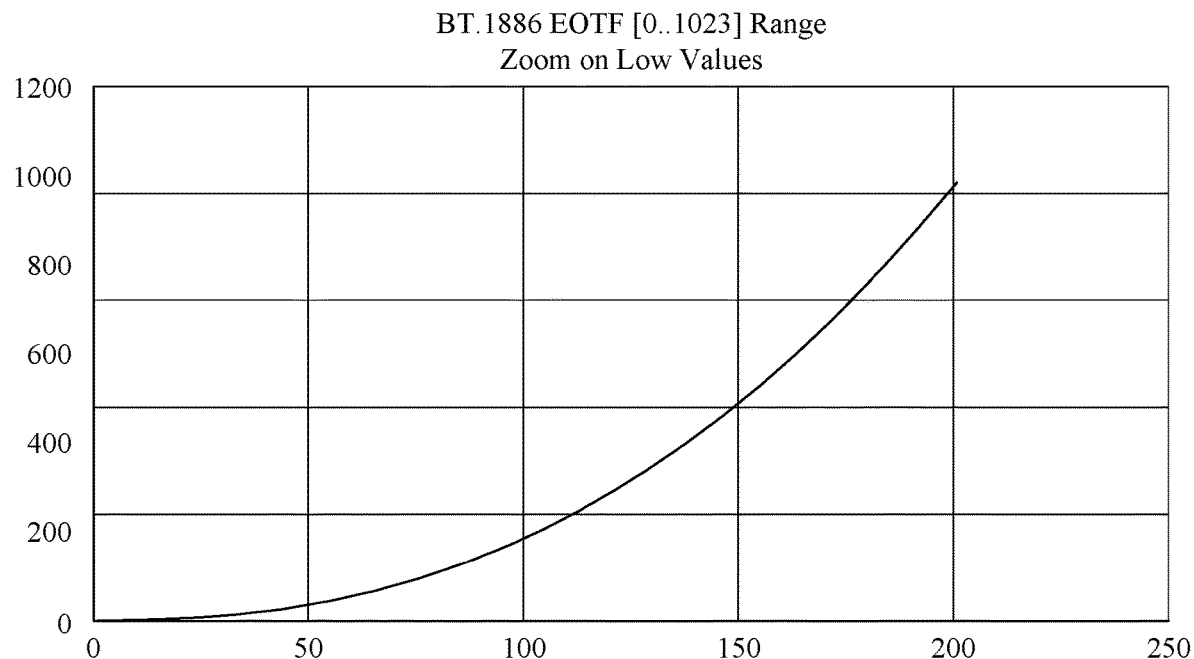
FIG. 11 illustrates a detail of the standard BT.1886 to linear transfer function.

FIG. 9 illustrates the modified BT.1886 EOTF TF1mod and FIG. 10 illustrates a detail of the modified BT.1886 EOTF TF1mod when, for example, $I_{lin}=0.01$, $I_{BT1886}=0.147$, $\text{Steep}_{T4}=14.68$. For comparison, FIG. 11 illustrates the same detail but for the standard BT.1886 EOTF TF1.

Figure 12:
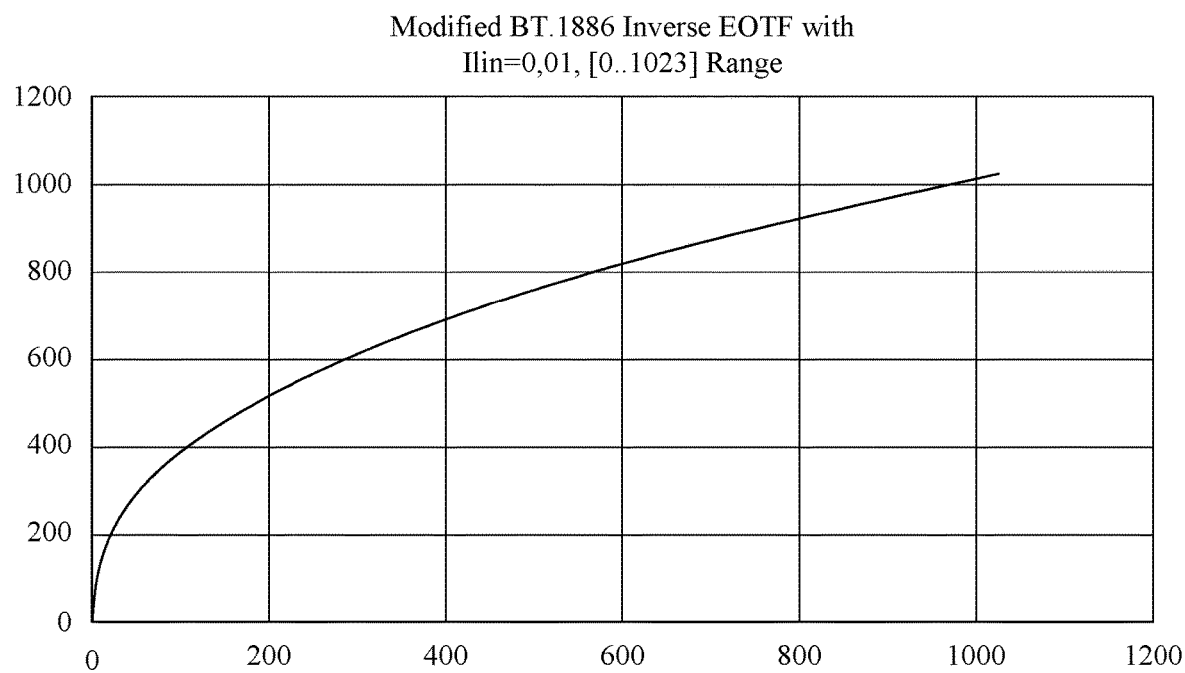
FIG. 12 illustrates a modified linear to BT.1886 transfer function.
Figure 13:
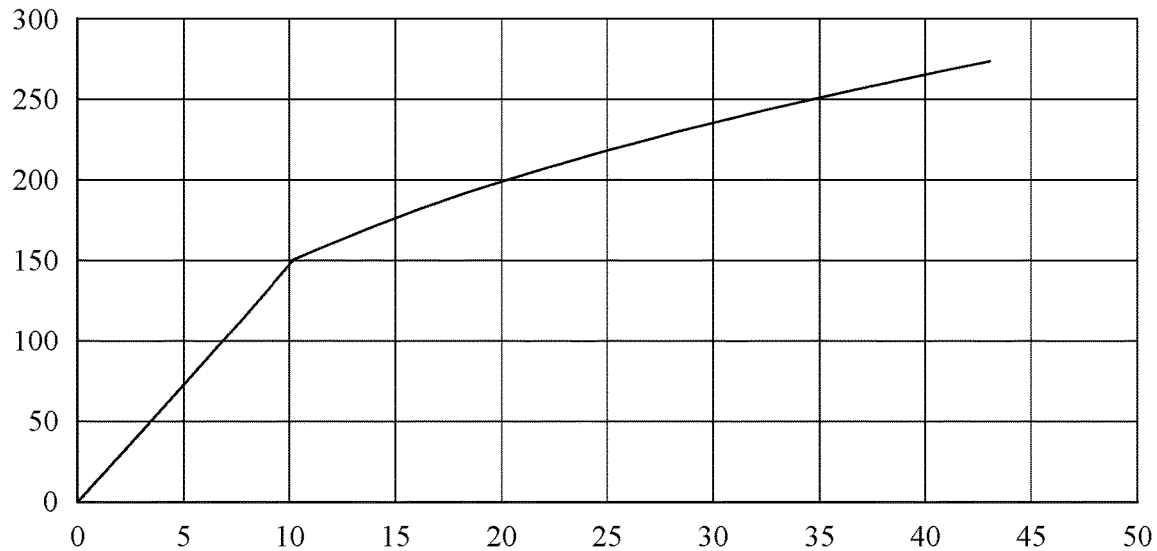
FIG. 13 illustrates a detail of the modified linear to BT.1886 transfer function.
Figure 14:
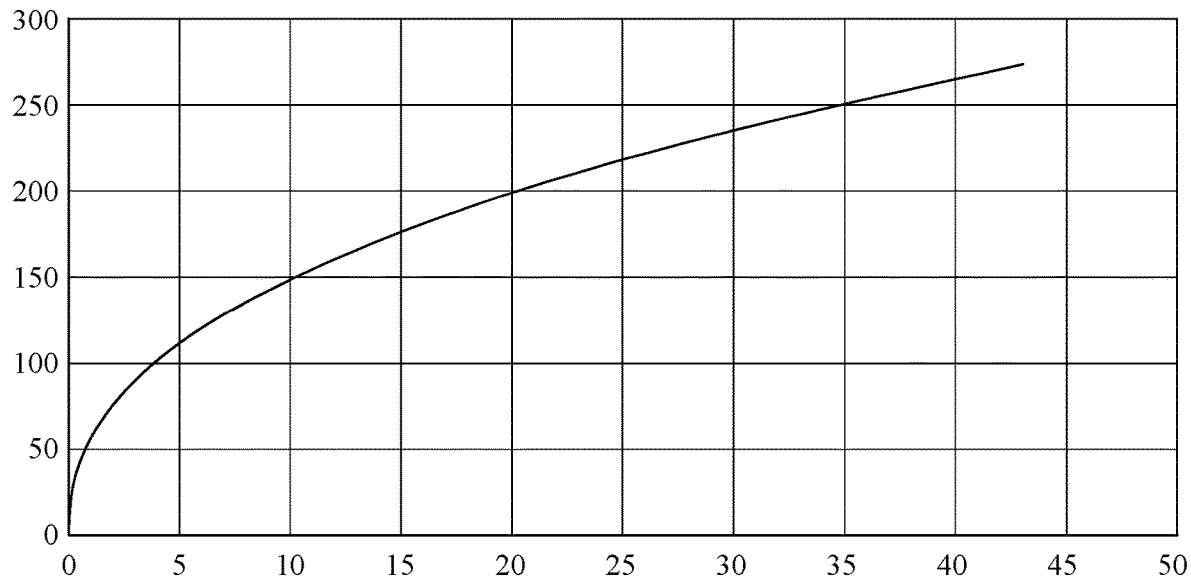
FIG. 14 illustrates a detail of the standard linear to BT.1886.

FIG. 12 illustrates the modified BT.1886 inverse EOTF TF4mod and FIG. 13 illustrates a detail of the modified BT.1886 inverse EOTF TF4mod again with $I_{lin}=0.01$, $I_{BT1886}=0.147$, $\text{Steep}_{T4}=14.68$. FIG. 14 illustrates the same detail but for the standard BT.1886 inverse EOTF TF4.

Figure 15:
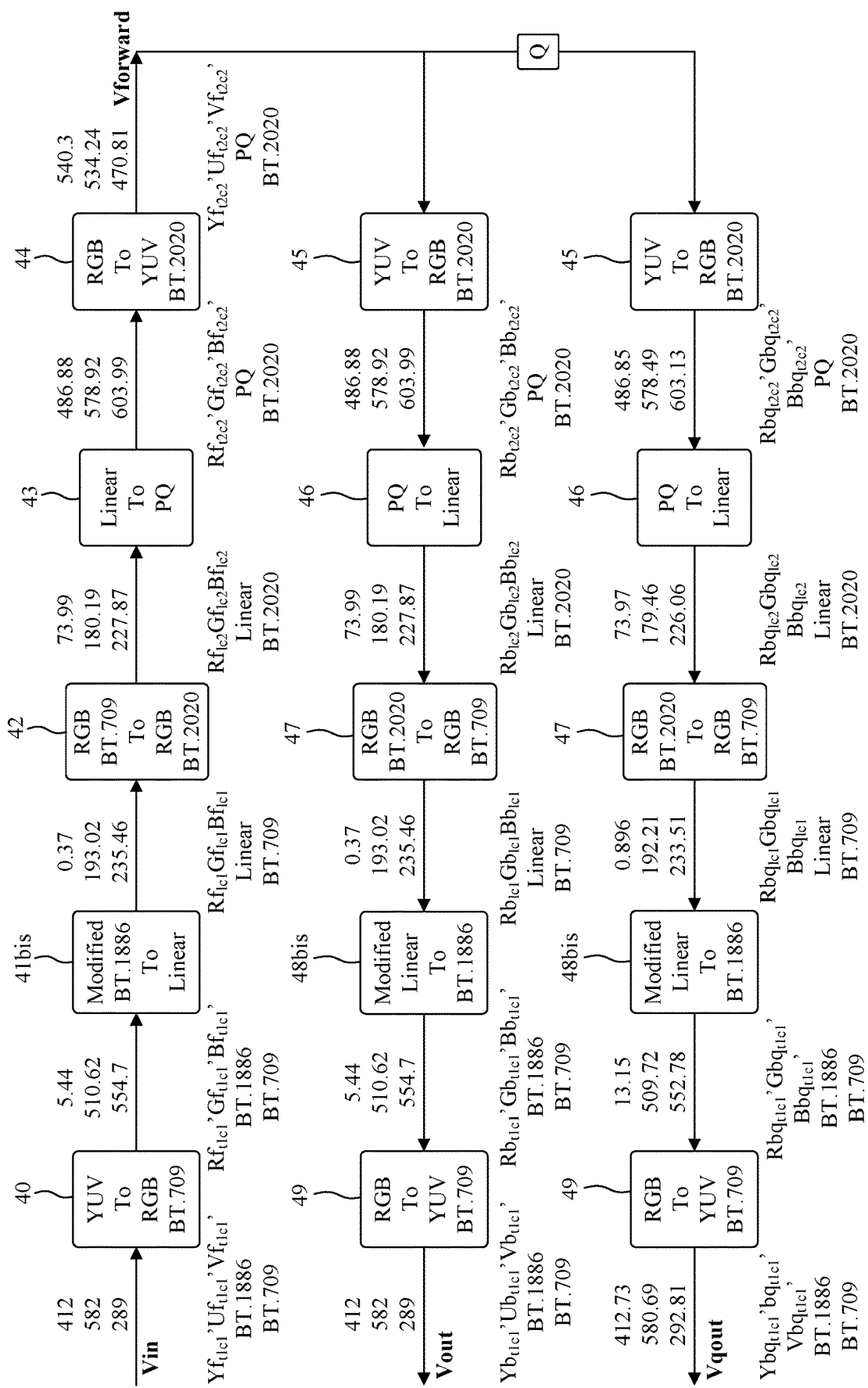
FIG. 15 illustrates schematically an example of a conversion with and without quantization with modified BT.1886 to linear transfer function and modified linear to BT.1886 transfer function; and, FIG. 16 illustrates schematically a method for computing a modified linear to BT.1886 transfer function.

Applying the modified BT.1886 EOTF TF1mod and the modified BT.1886 inverse EOTF TF4mod in the process of FIG. 5 with the same simple example of input value Vin (i.e. Y=412, U=582, V=289), the conversions with and without quantization now provide results illustrated in FIG. 15.

In this example, one can notice that, when using the modified BT.1886 EOTF TF1mod and the modified BT.1886 inverse EOTF TF4mod, the amplification effect on errors due to quantization is largely reduced. The difference between Vout and Vqout in this example is as follows:

Difference on Y is now 0.73, compared to 8.25 originally;
Difference on U is now 1.31, compared to 5.46 originally;
Difference on V is now 3.81, compared to of 21.88 originally.

This shows that the method allows limiting the amplification effect of errors due to quantization when exchanging a video content on a channel with a different color gamut than the content to be exchanged.

The method could be generalized to different EOTF (and inverse EOTF), other than the BT.1886 and the PQ ones.

We described above a number of embodiments. Features of these embodiments can be provided alone or in any combination. Further, embodiments can include one or more of the following features, devices, or aspects, alone or in any combination, across various claim categories and types:

A bitstream or signal that includes one or more of the described video content with converted color gamut, or variations thereof.

Creating and/or transmitting and/or receiving and/or decoding a bitstream or signal that includes one or more of the described video content with converted color gamut, or variations thereof.

A server, camera, TV, set-top box, cell phone, tablet, personal computer or other electronic device that performs at least one of the embodiments described.

A TV, set-top box, cell phone, tablet, personal computer or other electronic device that performs at least one of the embodiments described, and that displays (e.g. using a monitor, screen, or other type of display) a resulting picture.

A TV, set-top box, cell phone, tablet, personal computer or other electronic device that tunes (e.g. using a tuner) a channel to receive a signal including an encoded video content with converted color gamut, and performs at least one of the embodiments described.

A TV, set-top box, cell phone, tablet, or other electronic device that receives (e.g. using an antenna) a signal over the air that includes a video content with converted color gamut, and performs at least one of the embodiments described.

A server, camera, cell phone, tablet, personal computer or other electronic device that tunes (e.g. using a tuner) a channel to transmit a signal including a video content with converted color gamut, and performs at least one of the embodiments described.

A server, camera, cell phone, tablet, personal computer or other electronic device that transmits (e.g. using an antenna) a signal over the air that includes a video content with converted color gamut, and performs at least one of the embodiments described.

The invention claimed is:

1. A method comprising:
converting first picture data, the first picture data being in a first color gamut and corresponding to a first non-linear domain, into a linear domain to obtain second picture data;
converting the second picture data into a second color gamut while remaining in the linear domain to obtain third picture data; and,
converting the third picture data to fourth picture data corresponding to a second non-linear domain;
wherein converting the first picture data to obtain the second picture data comprises:
applying a conversion function to the first picture data to obtain the second picture data, said conversion function being a combination of a first and a second function, the first function being a linear function defined between zero and a second inflexion point a slope of which depending on a steepness value and the second function being a part of a first non-linear domain to linear domain transfer function defined from the second inflexion point, the second inflexion point being computed in the first non-linear domain from a first inflexion point obtained in the linear domain, the steepness value being computed from the first and second inflexion points.

2. The method according to claim 1, wherein the first function is represented by a straight line.

3. The method according to claim 1, wherein the steepness value is a result of a division of the second inflexion point by the first inflexion point.

4. The method of claim 1, wherein the first picture data are in a second color space and results from a conversion of input picture data in a first color space into the second color space and the fourth picture data are in the second color space and are converted in output data in the first color space.

5. Non-transitory information storage medium storing program code instructions for implementing the method according to claim 1.

6. A method comprising:
converting the first picture data, the first picture data being in a first color gamut and corresponding to a second non-linear domain, in a linear domain to obtain second picture data;
converting the second picture data into a second color gamut while remaining in the linear domain to obtain third picture data; and, converting the third picture data to fourth picture data in a first non-linear domain;
wherein converting the third picture data to the fourth picture data comprises:
applying a conversion function to the third picture data to obtain the fourth picture data, said conversion function being a combination of a first and a second function, the first function being a linear function defined between zero and a first inflexion point a slope of which depending on a steepness value and the second function being a part of a linear domain to first non-linear domain transfer function defined from the first inflexion point, the first inflexion point being obtained in the linear domain, the steepness value being computed from the first inflexion point and a second inflexion point, the second inflexion point being computed in the first non-linear domain from the first inflexion point.

7. The method according to claim 6, wherein the first function is represented by a straight line.

8. The method according to claim 6, wherein the steepness value is a result of a division of the second inflexion point by the first inflexion point.

9. The method of claim 6, wherein the first picture data are in a second color space and results from a conversion of input picture data in a first color space into the second color space and the fourth picture data are in the second color space and are converted in output data in the first color space.

10. Non-transitory information storage medium storing program code instructions for implementing the method according to claim 6.

11. A device comprising electronic circuitry configured for:
converting first picture data, the first picture data being in a first color gamut and corresponding to a first non-linear domain, into a linear domain to obtain second picture data;
converting the second picture data into a second color gamut while remaining in the linear domain to obtain third picture data; and,
converting the third picture data to fourth picture data corresponding to a second non-linear domain;
wherein converting the first picture data to obtain the second picture data comprises:
applying a conversion function to the first picture data to obtain the second picture data, said conversion function being a combination of a first and a second function, the first function being a linear function defined between zero and a second inflexion point a slope of which depending on a steepness value and the second function being a part of a first non-linear domain to linear domain transfer function defined from the second inflexion point, the second inflexion point being computed in the first non-linear domain from a first inflexion point obtained in the linear domain, the steepness value being computed from the first and second inflexion points.

12. The device according to claim 11, wherein the first function is represented by a straight line.

13. The device according to claim 11, wherein the steepness value is a result of a division of the second inflexion point by the first inflexion point.

14. The device of claim 11, wherein the first picture data are in a second color space and results from a conversion of input picture data in a first color space into the second color space and the fourth picture data are in the second color space and are converted in output data in the first color space.

15. A device comprising electronic circuitry configured for:
converting the first picture data, the first picture data being in a first color gamut and corresponding to a second non-linear domain, in a linear domain to obtain second picture data;
converting the second picture data into a second color gamut while remaining in the linear domain to obtain third picture data; and,
converting the third picture data to fourth picture data in a first non-linear domain;
wherein converting the third picture data to the fourth picture data comprises:
applying a conversion function to the third picture data to obtain the fourth picture data, said conversion function being a combination of a first and a second function, the first function being a linear function defined between zero and a first inflexion point a slope of which depending on a steepness value and the second function being a part of a linear domain to first non-linear domain transfer function defined from the first inflexion point, the first inflexion point being obtained in the linear domain, the steepness value being computed from the first inflexion point and a second inflexion point, the second inflexion point being computed in the first non-linear domain from the first inflexion point.

16. The device according to claim 15, wherein the first function is represented by a straight line.

17. The device of claim 16, wherein the first picture data are in a second color space and results from a conversion of input picture data in a first color space into the second color space and the fourth picture data are in the second color space and are converted in output data in the first color space.

18. The device according to claim 15, wherein the steepness value is a result of a division of the second inflexion point by the first inflexion point.

* * * * *